US010867366B2

(12) United States Patent
Li et al.

(10) Patent No.: US 10,867,366 B2
(45) Date of Patent: Dec. 15, 2020

(54) SYSTEM AND METHOD FOR DYNAMIC TRANSPARENT SCALING OF CONTENT DISPLAY (71) Applicant: Samsung Electronics Co., Ltd, Suwon-si (KR)

(72) Inventors: Xiaoguang Li, Mountain View, CA (US); Philippe Harscoet, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 15/827,701

(22) Filed: Nov. 30, 2017

(65) Prior Publication Data

US 2018/0357748 A1 Dec. 13, 2018

Related U.S. Application Data (60) Provisional application No. 62/517,851, filed on Jun. 9, 2017.

(51) Int. Cl.
*G06T 3/40* (2006.01)
*H04N 1/40* (2006.01)
(Continued)

(52) U.S. Cl.
CPC ........... *G06T 3/40* (2013.01); *G06K 9/00335* (2013.01); *G06K 9/00671* (2013.01);
(Continued)

(58) Field of Classification Search
CPC .. G06T 3/40; G06T 7/68; G06T 7/593; G06T 2207/10021; G06T 1/20; G06K 9/00671;
(Continued)

(56) References Cited

U.S. PATENT DOCUMENTS 7,009,579 B1 3/2006 Kondo et al.
8,878,904 B2 11/2014 Slavenburg et al.
(Continued)

FOREIGN PATENT DOCUMENTS

CN 106168890 A 11/2016
KR 101408719 B1 9/2012
(Continued)

OTHER PUBLICATIONS

ISA/KR, International Search Report and Written Opinion of the International Searching Authority for International Application No. PCT/KR2018/006597, dated Sep. 17, 2018, 9 pages.
(Continued)

*Primary Examiner* — Bobbak Safaipour (57) ABSTRACT

A method for dynamic scaling is disclosed. The method includes identifying first scene information to be rendered for display on an electronic device, the electronic device including a screen with a physical resolution, the first scene information associated with an application. The method also includes generating a scaling factor, the scaling factor controlling a resolution of the first scene information as rendered on the screen independently of the physical resolution of the screen. Additionally, the method includes rendering the first scene information as one or more pixels of a virtual display with a virtual resolution based on the scaling factor.

20 Claims, 5 Drawing Sheets (51) Int. Cl.
  *G06K 9/00* (2006.01)
  *G06T 7/68* (2017.01)
  *G06T 7/593* (2017.01)
  *G06K 9/62* (2006.01)
  *G06T 1/20* (2006.01)

(52) U.S. Cl.
  CPC ......... *G06K 9/6212* (2013.01); *G06K 9/6215* (2013.01); *G06T 7/593* (2017.01); *G06T 7/68* (2017.01); *H04N 1/40068* (2013.01); *G06T 1/20* (2013.01); *G06T 2207/10021* (2013.01)

(58) Field of Classification Search
  CPC ............. G06K 9/00335; G06K 9/6215; G06K 9/6212; H04N 1/40068
  See application file for complete search history.

(56) References Cited

U.S. PATENT DOCUMENTS

| | | | |
|---|---|---|---|
| 8,957,835 B2 | 2/2015 | Hoellwarth | |
| 9,049,426 B2 | 6/2015 | Costa et al. | |
| 9,310,891 B2 | 4/2016 | Rafii et al. | |
| 9,588,657 B1 | 3/2017 | Grechishkin et al. | |
| 9,747,665 B2* | 8/2017 | Orio | G09G 5/026 |
| 10,033,656 B2* | 7/2018 | Kravchik | H04L 67/20 |
| 10,410,398 B2* | 9/2019 | Hui | G06T 11/001 |
| 10,666,528 B1* | 5/2020 | Okman | H04L 67/2809 |
| 2003/0161551 A1* | 8/2003 | Coffland | H04N 5/23296 |
| | | | 382/298 |
| 2008/0136819 A1 | 6/2008 | Shivas et al. | |
| 2010/0158097 A1* | 6/2010 | Pascal | G06Q 10/107 |
| | | | 375/240 |
| 2011/0072380 A1 | 3/2011 | Jang | |
| 2013/0076750 A1 | 3/2013 | Park | |
| 2013/0188045 A1* | 7/2013 | Kalevo | G06T 7/194 |
| | | | 348/143 |
| 2014/0184626 A1 | 7/2014 | Narayanan et al. | |
| 2014/0210837 A1 | 7/2014 | Chu et al. | |
| 2014/0267616 A1 | 9/2014 | Krig | |
| 2016/0133055 A1 | 5/2016 | Fateh | |
| 2016/0180803 A1* | 6/2016 | Hui | G06F 40/103 |
| | | | 715/744 |
| 2016/0203583 A1* | 7/2016 | Shoshan | G06T 1/60 |
| | | | 345/428 |
| 2017/0316541 A1* | 11/2017 | Kim | G06F 9/451 |

FOREIGN PATENT DOCUMENTS

| | | |
|---|---|---|
| KR | 10-2016-0059264 A | 11/2014 |
| KR | 10-2005-0078798 A | 8/2015 |
| KR | 10-2016-0108158 A | 2/2016 |
| KR | 101718046 B1 | 3/2017 |

OTHER PUBLICATIONS

Supplementary European Search Report dated Feb. 4, 2020 in connection with European Patent Application No. 18 81 3097, 7 pages.

\* cited by examiner

SYSTEM AND METHOD FOR DYNAMIC TRANSPARENT SCALING OF CONTENT DISPLAY

CROSS-REFERENCE TO RELATED APPLICATION AND CLAIM OF PRIORITY

This application claims priority under 35 U.S.C. § 119(e) to U.S. Provisional Patent Application No. 62/517,851 filed on Jun. 9, 2017. The above-identified provisional patent application is hereby incorporated by reference in its entirety.

TECHNICAL FIELD

This disclosure relates generally to display technology. More specifically, this disclosure relates to rendering scene information for display on an electronic device, the electronic device including a screen with a physical resolution.

BACKGROUND

Digital devices, such as smartphones, tablets, mobile communication terminals, virtual reality headsets and the like can generate displays from scene information received from an application according to a producer-consumer paradigm. According to this paradigm, pixels are generated, or rendered from the scene information. The generated pixels are then consumed, or composited, as parts of a display on the screen of a digital device. The sequence of steps by which pixels are produced and consumed can be referred to as a "graphics pipeline." Production of pixels can be logically coupled to the physical resolution of the digital device and/or the underlying logic of the application. Logically coupling the production side of a graphics pipeline to the physical resolution of the display screen can result in producing pixels that are not consumed, thereby wasting processor and system resources. Further, logically coupling the production side of the graphics pipeline to the resolution of a screen presents obstacles to presenting scene information from legacy applications on newer screens with physical resolutions not contemplated at the time the legacy applications were developed.

SUMMARY

Embodiments of the present disclosure provide systems and methods for dynamic scaling of a content display.

In a first embodiment, a method for dynamic scaling is provided. The method includes identifying first scene information to be rendered for display on an electronic device, the device including a screen with a physical resolution, and the first scene information associated with an application. The method includes generating a scaling factor, the scaling factor controlling a resolution of the first scene information as rendered on the screen independently of the physical resolution of the screen. Additionally, the method includes rendering the first scene information as one or more pixels of a virtual display with a virtual resolution based on the scaling factor.

In a second embodiment, a system for dynamic scaling is provided. The system includes a memory, an electronic device including a screen with a physical resolution, and a processor operably connected to the memory. The processor is configured to identify first scene information to be rendered for display on the screen, the first scene information associated with an application. The processor is also configured to generate a scaling factor, the scaling factor controlling a resolution of the first scene information as rendered on the screen independently of the physical resolution of the screen. Further, the processor is configured to render the first scene information as one or more pixels of a virtual display with a virtual resolution based on the scaling factor.

In a third embodiment, a non-transitory computer-readable medium having program code is provided. The program code, when executed by a processor, causes a system to identify first scene information to be rendered for display on an electronic device, the electronic device including a screen with a physical resolution, and the first scene information associated with an application. The program code, when executed by the processor, causes the system to generate a scaling factor, the scaling factor controlling a resolution of the first scene information as rendered on the screen independently of the physical resolution of the screen. Additionally, the program code, when executed by the processor, causes the system to render the first scene information as one or more pixels of a virtual display with a virtual resolution based on the scaling factor.

Other technical features can be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system or device.

Figure 1:
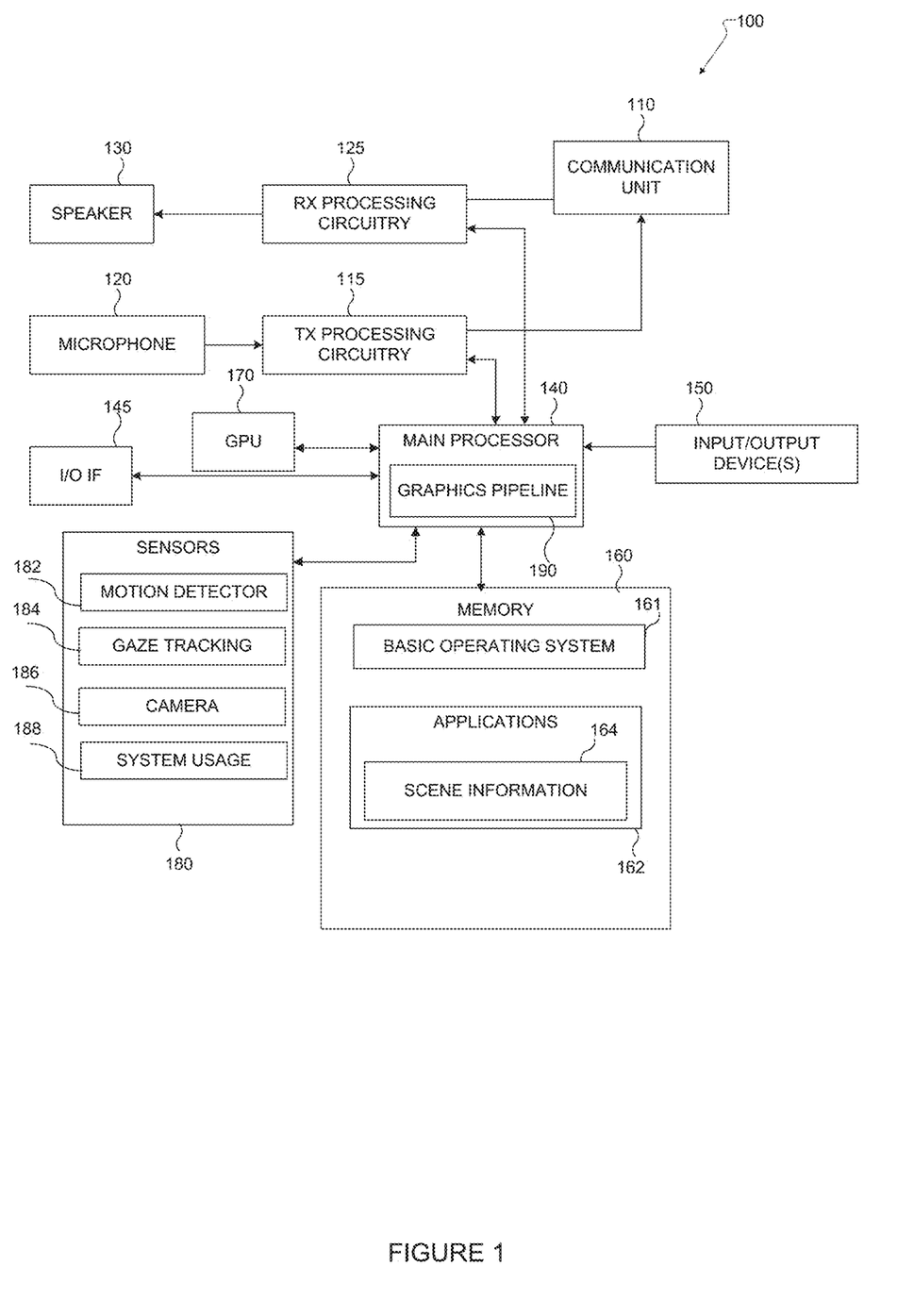
FIG. 1 illustrates an electronic device in which various embodiments of the present disclosure can be implemented.

FIG. 1 illustrates an example of a device for implementing dynamic transparent scaling according to this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes a basic operating system (OS) program 161 and one or more applications 162.

Applications 162 can include legacy applications, or applications developed for, and having application logic tied to characteristics of legacy devices, such as display resolution, touch sensor functionalities. Additionally, applications 162 can output scene information 164 for rendering and presentation on an input/output device 150, such as a screen.

The communication unit 110 may receive an incoming RF signal such as a Bluetooth® or Wi-Fi® signal. The communication unit 110 may down-convert the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the basic OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user, sensors 180 or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device. Input/output device(s) 150 are, according to certain embodiments, associated with one or more of sensor(s) 180 to provide input to main processor 140.

Input/output device(s) 150 can include one or more screens, which can be a liquid crystal display, light-emitting diode (LED) display, an optical LED (OLED), an active matrix OLED (AMOLED), or other screens capable of rendering graphics. The one or more screens can include a plurality of display elements, such as electronically modulated light emitting diodes, that define a physical, or native resolution of a screen comprising input/output device(s) 150. For example, a WQHD display can have a physical resolution of 2560×1440 pixels. Additionally, screens can include a touchscreen capable of registering tactile inputs correlating with pixels of the screen and/or regions of the screen.

The main processor 140 can be configured to implement a graphics pipeline 190, including performing rendering and compositing operations according to control logic provided by basic operating system 161, applications 162 and/or other executable program code stored in memory 160.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170, and sensors 180. Main processor 140 can offload processing tasks associated with implementing graphics pipeline 190 to GPU 170. Such graphics processing tasks can include, without limitation, shading, primitive assembly and/or rasterization.

Sensors 180 can comprise a variety of sensors for generating inputs processed by device 100, and include without limitation, accelerometers, digital cameras, touch sensors, digital thermometers, pressure sensors and global positioning system sensors. For example, sensors 180 can include a motion detector 182. Motion detector 182 can be an optical sensor, an accelerometer or a gyroscopic sensor. Additionally, motion detector 182 can comprise multiple motion detectors, such as motion detectors coupled to a user's head and/or limbs. Additionally, sensors 184 may include cameras and other sensors 184 suitable for performing gaze tracking of a user's eyes, to detect which portions of the screen a user's gaze is focused upon. Sensors 180 can include additional cameras 186, including cameras disposed on the back side of screen, including sensors for providing an augmented reality (AR) experience, in which digital images are superimposed over the view of a camera positioned on or near a user's eye. Further, sensors 180 can include sensors 188 configured to monitor the usage of system resources, including, without limitation, main processor 140, GPU 170 and/or memory 160.

Although FIG. 1 illustrates one example of a device 100 for implementing dynamic transparent scaling, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
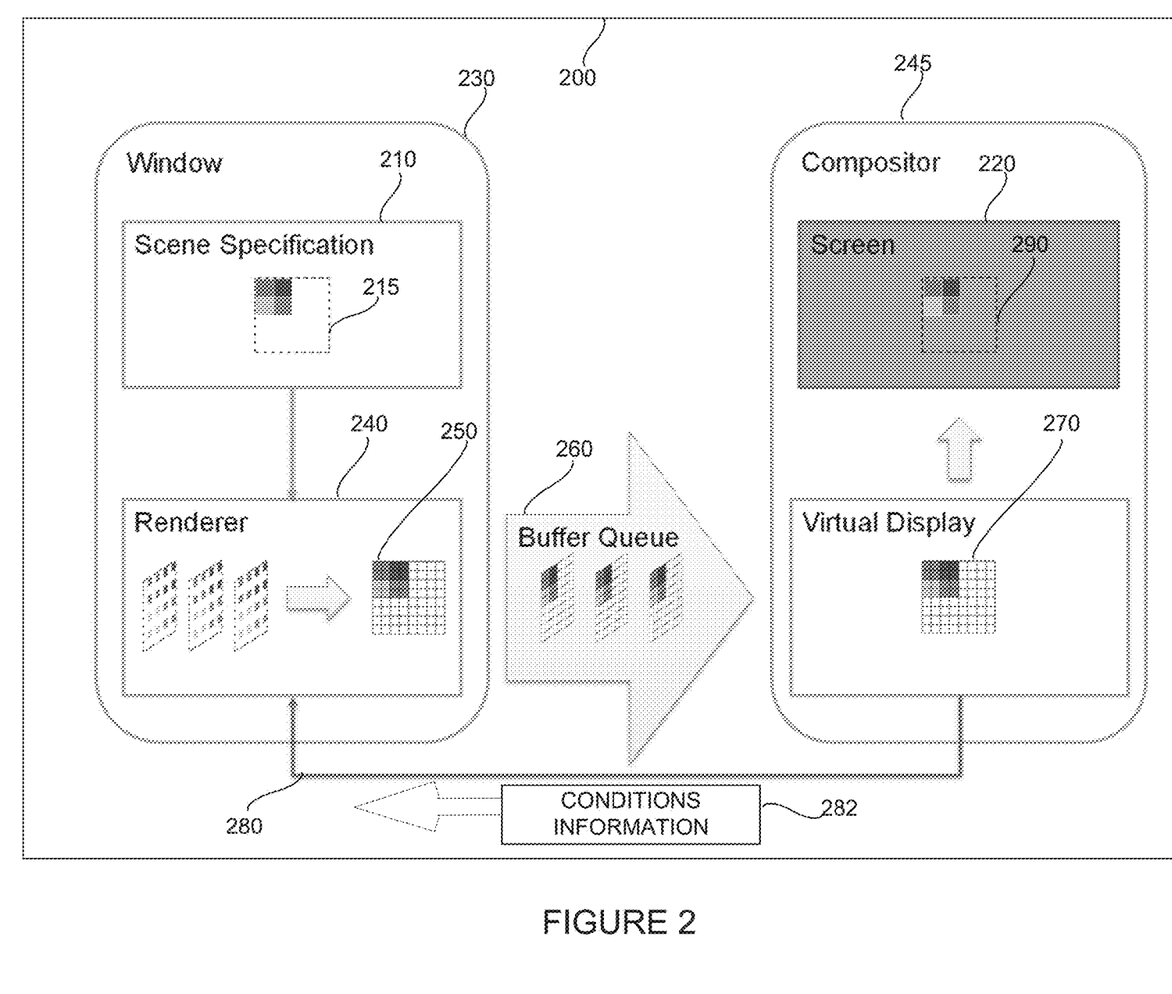
FIG. 2 illustrates a graphics pipeline according to certain embodiments of the present disclosure.

FIG. 2 illustrates a graphics pipeline 200 providing dynamic transparent scaling of content display according to certain embodiments of this disclosure. As shown in FIG. 2, according to certain embodiments, graphics pipeline 200 embodies a producer-consumer paradigm. Graphics pipeline 200 can be implemented on any suitable electronic device, including without limitation, electronic devices such as described with respect to FIG. 1 herein. Specifically, graphics pipeline 200 can be implemented by a processor, including without limitation, main processor 140 and/or GPU 170 as described with respect to FIG. 1 herein. Alternatively, graphics pipeline 200 can be implemented on a virtual machine (VM), cloud platform or networked server.

In the example of FIG. 2, a scene specification 210 is provided by an application executing on an electronic device. In certain embodiments, the application is displayed as part of a window managed by a window manager 230 provided by the device's OS, wherein the window manager 230 operates as an interface between an application and the graphics pipeline 200.

Window manager 230 interfaces with one or more applications to receive scene specification 210. Scene specification 210 specifies features 215 to be rendered by renderer 240 as a set of pixels 250. In this non-limiting example, scene specification 210 calls for four, four-pixel blocks of different shades occupying the upper left quadrant of screen 220. According to certain embodiments, scene specification 210 can include geometry data and/or vertex information associated with the scene.

In this example, scene specification 210 is rendered as a set of pixels 250 by renderer 240. Renderer 240 produces pixels for consumption by compositor 245. In certain embodiments, renderer 240 can be a software module, or it can be a process executed by a processor, such as main processor 140 or GPU 170 shown in FIG. 1.

Post-rendering, set of pixels 250 is stored in buffer queue 260, and then as a scaled virtual display or surface 270. Depending on the context, buffer queue 260 can be a double or triple buffer queue. Use of a triple buffer can be necessary in certain cases, including for example, when an application crosses a process boundary or to minimize latency.

Subsequently, compositor 245 composites virtual display 270 as an image 290 appearing on screen 220. In this example, scene specification 210 calls for four square blocks to be displayed in the upper-left quadrant of screen 220. In this example, the physical resolution of screen 220 is shown as 8 pixels by 8 pixels. This particular physical resolution is chosen for purposes of illustration only, and much larger physical and virtual resolutions can be used in varying embodiments.

In certain embodiments, the production side of the graphics pipeline, and in particular, the rendering processes can be logically decoupled from the physical resolution of screen 220. In the example shown in FIG. 2, this decoupling can be achieved by establishing a channel 280 between compositor 245 and renderer 240 to provide conditions information 282 regarding conditions at the compositor 245 to renderer 240. Conditions can at the compositor 245 can include, without limitation, scale adjustments requested by a user, system or processes on the device, processor usage, memory usage and control inputs. In this way, renderer 240 can, in response to the conditions information 282 received via channel 280, produce a set of pixels 250 corresponding to the virtual resolution of virtual display 270, rather than the physical resolution of screen 220. In this way, the production of pixels by renderer 240 can be tuned in response to the consumption needs of compositor 245, and the heightened render load resulting from unnecessary overproduction of pixels can be reduced or even eliminated.

Reducing the render load associated with overproduction of pixels by establishing channel 280 can significantly reduce overall computational overhead of the system (such as device 100 of FIG. 1). For example, in cases where the physical resolution of the screen is high, such as in devices having a Wide Quad High Definition ("WQHD") display, necessarily rendering scene information at the physical resolution of the screen can present significant processor and memory overhead. High memory usage can be a particularly acute problem in applications, such as virtual reality ("VR") applications, where rendered pixels are double or triple buffered to avoid variations in frame rate, as such jitters in frame rate can be associated with motion sickness. For example, rendering scene information for a single application at WQHD often consumes approximately 15 MB of memory per rendered surface. This memory consumption can be doubled or tripled when rendered surfaces are queued, necessitating a double or triple buffer.

The addition of channel 280 can also remedy inefficiencies and misdirection of resources associated with overproduction of pixels in situations where scene information is rendered more than once, such as in applications specifying a stereoscopic image (e.g., two versions of the same image varying slightly to create the appearance of three-dimensional depth).

In certain embodiments, the conditions information 282 regarding conditions at compositor 445 can be provided to renderer 240 via channel 280 can be provided as a scaling parameter, or scaling factor to be applied by renderer 240 while generating set of pixels 250. In such cases, the scaling factor may reflect the virtual resolution of virtual display 270 relative to the physical resolution of screen 220. For example, if, due to conditions at compositor 245, virtual display 270 is to be composited such that it occupies only a quarter of screen 220, a scaling factor of 0.25 may be passed via channel 280. Applying a scaling factor of 0.25 as a resolution control signal, renderer 240 generates a set of pixels 250 corresponding to the virtual resolution of virtual display 270. Thus, for the same scene specification under the same compositor conditions, renderer 240 generates one quarter as many pixels as it would have prior to the addition of channel 480.

Applying a scaling factor to control the number of pixels produced by renderer 440 to match the virtual resolution of virtual display 470 can not only relieve the processor load associated with generating set of pixels 250, but can also reduce the memory load associated with maintaining buffer queue 260, as fewer pixels require buffering.

According to certain embodiments, the scaling factor provided via channel 280 can specify a virtual display resolution that is arbitrary and independent of both the physical resolution of screen 220 and the size of virtual display 270 as composited on screen 220. For example, in certain embodiments where multiple scenes from multiple applications are being rendered and composited onto screen 220, the scaling factor may reflect a determined prioritization of rendering resources between applications. For example, an application to be displayed at a specified screen size in the foreground of screen 220 may be determined to have priority over another application displayed at the same screen size in the background of screen 220. Alternatively, priority may be determined based on applications' relative processor and/or memory requirements. For example, where content from a word processing application and a video application are to be simultaneously displayed, the video application may be prioritized and a reduced scaling factor may be provided for the rendering of content from the word processing application. In such cases the word processing application may be rendered at a lower resolution in order to free up system resources needed by the video application. In a further example, a scaling factor may be sufficiently small that scene information is rendered at a sub-physical scale (e.g., smaller than a pixel of screen 220).

Additionally, the value of the scaling factor provided via channel 280 can, in certain embodiments, be adjusted dynamically such that successive frames associated with an application are rendered at different resolutions. The value of the scaling factor may be varied in response to a control input received by a sensor of the electronic device implementing graphics pipeline 200. Such control inputs include, without limitation, a detected movement of the electronic device, gaze tracking of a display or screen, inputs received from an application, and/or inputs associated with memory usage or processor usage.

As an illustrative, non-limiting example, if the electronic device is included as part of a head-mounted display (HMD) for providing a VR experience, the electronic device may detect motion (e.g., a movement of the user's head), and in response thereto, dynamically adjust the value of the scaling factor downwards to reduce the rendering load on the processor. Reducing the rendering load can help reduce the incidence of jitters in the frame rate of the display on the screen, as such variations can be associated with motion sickness in some users. Alternatively, the electronic device may track a user's gaze, and issue a control input to indicate that a user's gaze has been detected as having moved away from content provided by one or more applications. To conserve resources and prioritize the screen content upon which a user's gaze is focused on, the scaling factor for one or more applications may be dynamically adjusted upwards or downwards. In another example, a user may provide an input associated with a heavy render load, such as a command changing all of the scenery in a game. In response to such a user input, the scaling factor for one or more applications may be adjusted to ensure that the processor and memory resources necessary for rendering the scene change are available. The foregoing examples are non-limiting, and other embodiments are possible.

Additionally, the scaling factor provided to renderer 240 via channel 280 can operate to decouple the application logic of the application that provides scene specification 210 from the process(es) for rendering scene specification 210 performed by renderer 240.

Decoupling the production side, in particular, the rendering processes of the graphics pipeline, to the physical resolution of the screen can extend the lifecycle of legacy applications, by enabling legacy applications to run on newer, higher-resolution devices, or in presentation environments not contemplated at the time legacy applications were developed. For example, the application logic of applications developed for older platforms may output scene specifications that are logically tied to the screen resolution (s) of a legacy platform. Similarly, inputs, such as touchscreen inputs, for such applications can be tied to the physical resolution of the platforms for which they were developed. So long as the rendering process is logically coupled to a physical resolution, displaying such legacy applications on newer platforms with screens having physical resolutions not specified in the legacy application logic can entail the undesirable task of re-coding the application logic for the physical screen resolutions of newer platforms. Providing a scaling factor to renderer 240 via channel 280 can decouple the application logic from rendering processes, and legacy applications can be run on different resolution screens without any change in the application logic. In other words, the addition of channel 280 allows the rendering process(es) to become transparent to the logic of a legacy application.

As discussed above, the inputs and outputs of certain legacy applications can be logically coupled to the physical resolution of the platform(s) for which they were originally developed. As an example, for an application receiving inputs from a touchscreen, the application logic may interpret such touchscreen inputs on a coordinate system defined by the physical resolution of the platform for which the legacy application was developed. In certain embodiments, a scaling factor setting the virtual resolution of virtual display 270 to match the physical resolution required by the application logic of a legacy application can be used. In such cases, the integrity of the legacy application's inputs and outputs can be preserved, and the rendering process becomes transparent to the application logic. This is because, from the legacy application's perspective, it is interacting with a screen having the physical resolution of a legacy platform. Compositor 245 can, when compositing virtual display 270, rescale virtual display 270 to occupy a desired portion of screen 220. Skilled artisans will appreciate that the foregoing examples are illustrative and not limiting of embodiments as disclosed herein.

Figure 3:
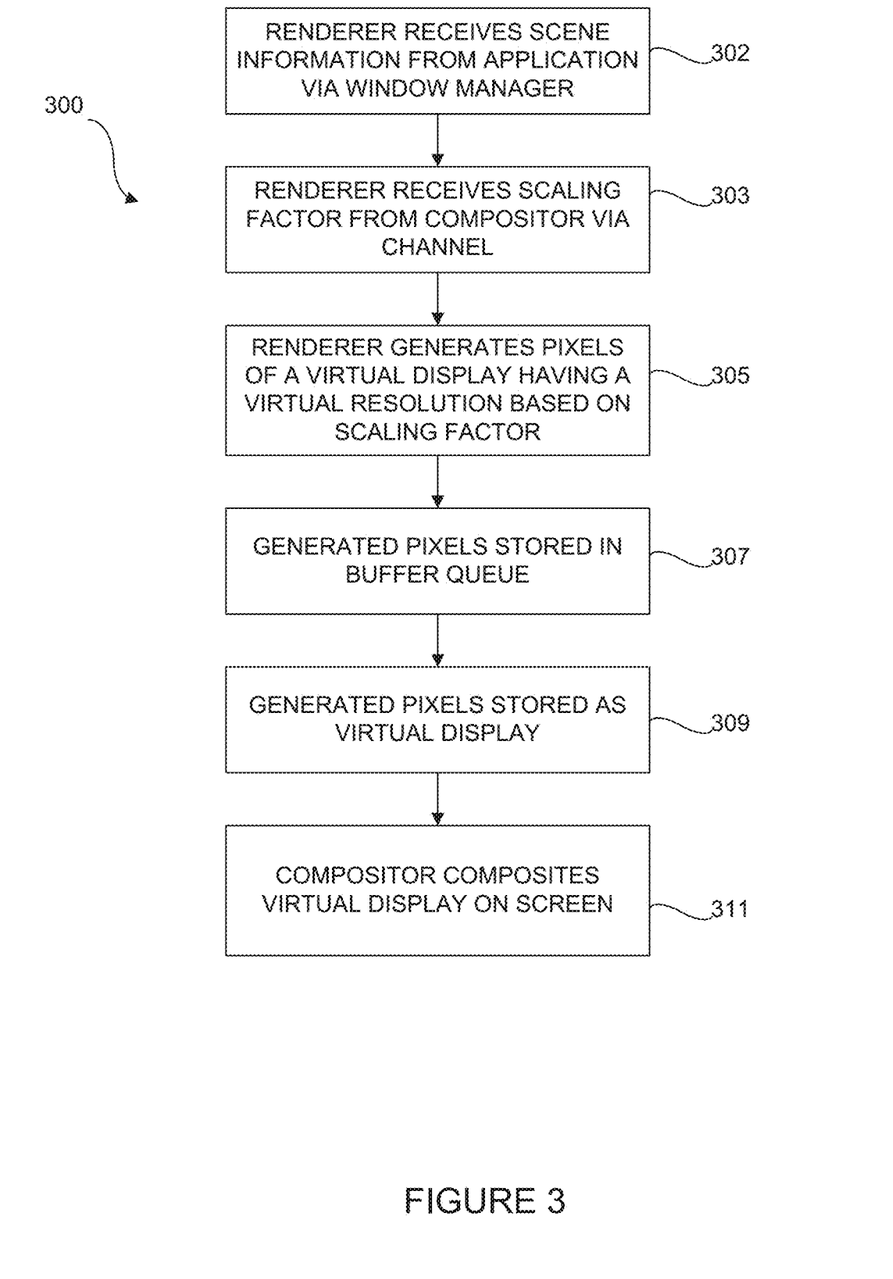
FIG. 3 illustrates a process for providing a scaling factor according to certain embodiments of this disclosure.

FIG. 3 illustrates a process 300 for providing a scaling factor according to certain embodiments of this disclosure.

In this example, in operation 302, a renderer such as renderer 240 in FIG. 2, receives a scene specification from an application. In operation 303, the renderer receives, via a channel established between the compositor and the renderer, information regarding conditions at the compositor. In this example, the information is provided as a scaling factor which controls the resolution of the scene information as rendered on a screen independently of the physical resolution of the screen. The scaling factor can, in certain embodiments, be provided as a private flag from the compositor. In operation 305, the renderer generates the pixels of a virtual display, the virtual display having a virtual resolution based on the scaling factor. By generating pixels at a resolution controlled by the scaling factor, rather than defaulting to the physical resolution of the device screen, the renderer can generate pixels according to an adjustable pixel budget, thereby saving processing resources. In operation 307, the generated pixels are stored in a buffer queue. By generating fewer pixels, the memory consumption associated with buffering rendered images can be reduced. In operation 309, the generated pixels are stored as a surface, or virtual display. In operation 311, the compositor composites the virtual display on the screen for display.

Figure 4:
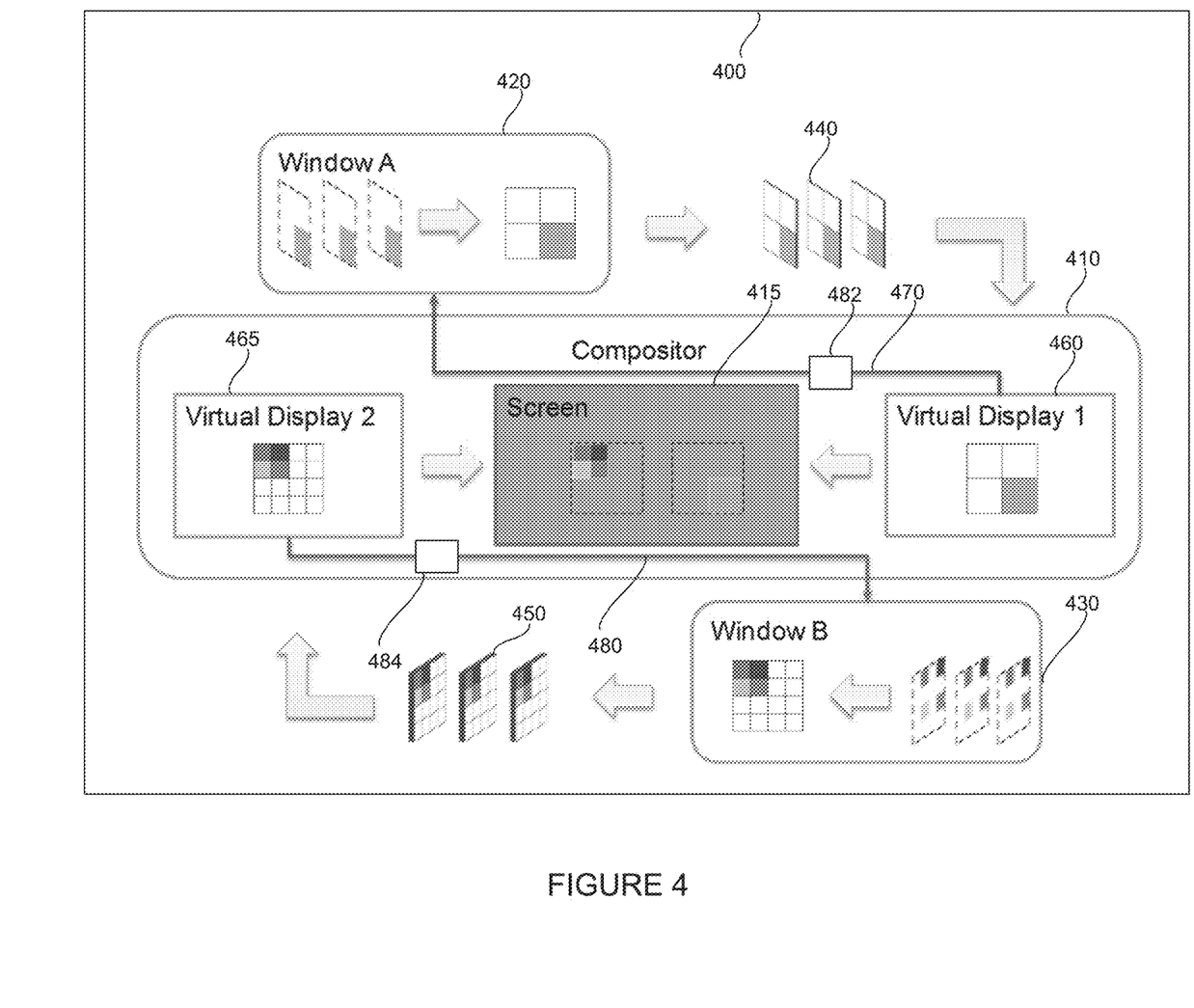
FIG. 4 illustrates a graphics pipeline according to certain embodiments of the present disclosure.

FIG. 4 illustrates a graphics pipeline 400 according to certain embodiments. Graphics pipeline 400 may be implemented on any suitable electronic device, including without limitation, electronic devices such as described with respect to FIG. 1 herein. Alternatively, graphics pipeline 400 may be implemented on a virtual machine (VM), cloud platform or networked server.

In the example of a graphics pipeline 400 shown in FIG. 4, compositor 410 consumes rendered pixels from a first producer of pixels 420 associated with a first window manager ("Window A"), which receives scene information from an application to be rendered and composited on screen 415, and a second producer of pixels 430 associated with a second window manager ("Window B") which receives scene information from an application to be rendered and composited on screen 415. In this example, first producer 420 and second producer 430 can receive scene information from two separate applications. In such cases, the composited display on screen 415 may appear as two application windows.

Alternatively, first producer 420 and second producer 430 may be receiving related scene information from a single application to be rendered and composited on screen 415. In such cases, the display on screen 415 can be presented as a stereoscopic image, which when suitably viewed by a user, such as through a head-mounted display (HMD), can provide an image having a three-dimensional appearance.

In this example, a first channel 470 between first virtual display 460 and first producer 420, and a second channel 480, between second virtual display 465 and second producer 430 is provided. First channel 470 can provide first producer 420 with first information 482 regarding conditions at compositor 410, the first information 482 including, according to some embodiments, a first dynamically adjustable scaling factor. Likewise, second channel 480, can provide second producer 430 with second information 484 regarding conditions at compositor 410, including, according to certain embodiments, a second dynamically adjustable scaling factor. Skilled artisans will appreciate that in certain embodiments, compositor 410 can consume pixels provided by three or more producers and provide condition information, including three scaling factors, to three or more producers via three separate channels. Further embodiments utilizing more producers and more channels are possible.

In this example, first producer 420 can produce pixels corresponding to the virtual resolution of first virtual display 460 based on a first scaling factor provided via first channel 470. Thus, the amount of pixel data to be stored in buffer queue 440. Likewise, a second scaling factor provided via second channel 480 can tune the pixel output of second producer 430 to match the demands of compositor 410, thereby reducing the quantity of pixel data to be stored in buffer queue 450.

The introduction of additional channels, such second channel 480 provides the benefit of reducing the risks of inefficiencies feeding back onto themselves in multi-producer graphics pipelines. Each additional producer of pixels increases the processing and memory load, especially where each additional producer of pixels is overproducing pixels.

Figure 5:
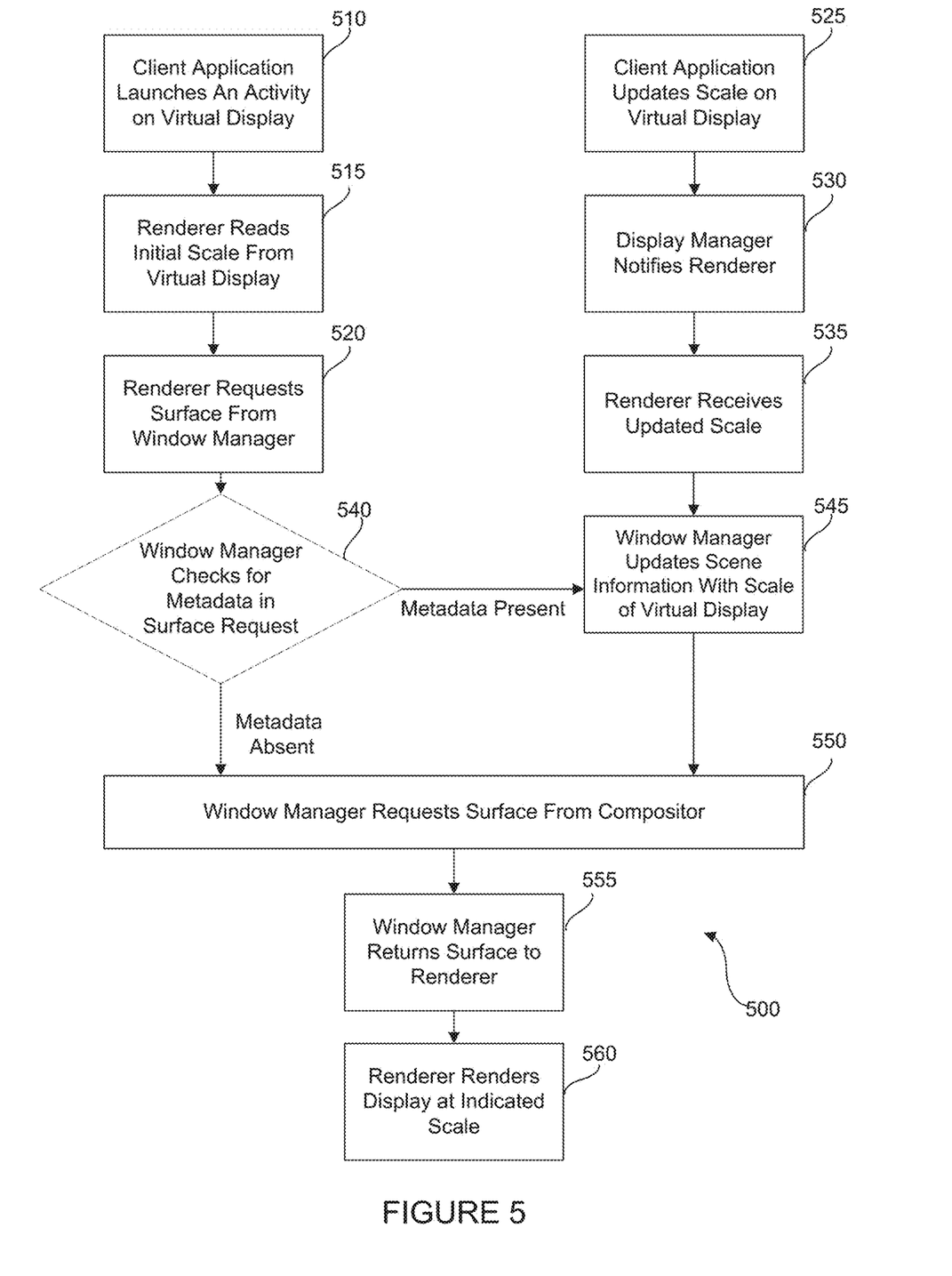
FIG. 5 illustrates a process for providing a scaling factor according to certain embodiments of this disclosure.

FIG. 5 illustrates a process 500 for providing condition information via a consumer-producer channel according to certain embodiments of this disclosure. The example shown in FIG. 5 can be implemented on devices using a variety of operating systems, including, without limitation, Android, iOS and Windows® operating systems. The example of FIG. 5, shows condition information being provided to a renderer, such as the renderer 240 shown in FIG. 2 herein, according to two operating contexts.

In a first context, the process begins with operation 510, where a client application launches activity on a virtual display. In this particular example, the client application is a virtual reality environment application with application programming interfaces (APIs) for receiving activity from host applications, such as legacy applications, and presenting the host applications as part of a virtual reality presentation. In this example, launching an activity on a virtual display can comprise opening a host application having data in a virtual display to be composited on a screen. In this example, the virtual display can be a virtual display such as virtual display 270 shown in FIG. 2.

Next, at operation 515, the renderer reads an initial scale associated with the launched activity on the virtual display. In this example, the initial scale can be the value of a scaling factor, and reflecting the resolution of a display to be rendered relative to the physical resolution of the screen to which the display is to be composited. In some embodiments, this initial scale can be conditions information, such as passed At operation 520, the renderer requests a surface, the surface corresponding to scene information to be rendered and composited on a screen, from a window manager. In this example, the window manager can be a window manager such as window manager 230 shown in FIG. 2.

At operation 540, the window manager checks for metadata in the surface request from the renderer indicating that the scale of the virtual display needs to be updated. In some embodiments, the metadata can be a private flag or other data received by the renderer, from the compositor, indicating that the scale of the virtual display to be composited has changed.

If the metadata is present, the process moves to operation 545, wherein the window manager updates the scene information to be rendered with data indicating a new scale for a virtual display. Alternatively, if the metadata indicating the need to update the scale of a virtual display is not present, the process moves to operation 550, at which point, the window manager requests a surface to be composited by the compositor. Subsequently, the process moves to operation 555, wherein the window manager returns the surface to the renderer to generate pixels corresponding to the scene information at the indicated scale. At operation 560, the renderer renders the scene information as pixels corresponding to the indicated scale.

In the second operating context illustrated by FIG. 5, an application, such as a legacy application has already been launched as an activity within a client application. In this example, the client application may be a virtual reality application, but other embodiments are possible, such as client applications for adding a stereoscopic view to existing applications. In this second context, the process begins at operation 525, where the client application updates the scale for a scene provided by an application presented within the environment of the client application. Subsequently, process 500 moves to operation 530, during which a display manager notifies the renderer of the change to the scale on the virtual display. In some embodiments, the display manager can be a module provided by a device's operating system for managing the properties of the device's screens. At operation 535, the renderer receives, from the display manager, a notification of the updated scale at which the application scene is to be rendered. Subsequently, the process 500 moves to operation 545 and proceeds as described above.

Although the present disclosure has been described with exemplary embodiments, various changes and modifications may be suggest to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for dynamic scaling, the method comprising:
   identifying first scene information to be rendered by a renderer, as pixels for display on an electronic device, the electronic device including a screen with a physical resolution, the first scene information associated with an application;
   receiving, at the renderer, conditions information from a compositor, the compositor consuming rendered pixels provided by the renderer through a buffer queue;
   generating a scaling factor based on the conditions information, the scaling factor controlling a resolution of the first scene information as rendered by the renderer;
   rendering the first scene information as pixels at a resolution based on the scaling factor;
   storing the rendered pixels in the buffer queue as a virtual display with a virtual resolution which is different from the physical resolution of the screen; and
   compositing the virtual display on the screen,
   wherein the compositor is configured to provide a display at the physical resolution of the screen by consuming some or all of the rendered pixels provided by the renderer through the buffer queue.

2. The method according to claim 1, further comprising:
   receiving a control input; and
   adjusting the scaling factor in response to the control input.

3. The method according to claim 2, wherein the control input is based on at least one of a detected movement of the electronic device, a gaze tracking of the screen, a memory usage, a processor usage or an input from the application.

4. The method according to claim 1, further comprising:
   identifying second scene information to be rendered as pixels for display on the screen;
   receiving, at the renderer, second conditions information from the compositor,
   generating a second scaling factor based on the second conditions information, the second scaling factor controlling a resolution of the second scene information as rendered;
   rendering the second scene information as second pixels at a second resolution based on the second scaling factor;
   storing the rendered second pixels in a second buffer queue as a second virtual display; and
   compositing the second virtual display on the screen.

5. The method according to claim 4, further comprising generating the second scaling factor based on a prioritizing factor associated with the second scene information.

6. The method according to claim 2, wherein the control input is an input from the application and the first scene information is rendered without modification of the application.

7. The method according to claim 1, wherein the application is a legacy application.

8. A system for dynamic scaling, the system comprising:
   a memory;
   an electronic device including a screen with a physical resolution; and
   a processor operably connected to the memory, the processor configured to:
   identify first scene information to be rendered by a renderer, as pixels for display on the screen, the first scene information associated with an application,
   receive, at the renderer, conditions information from a compositor, the compositor consuming rendered pixels provided by the renderer through a buffer queue,
   generate a scaling factor based on the conditions information, the scaling factor controlling a resolution of the first scene information as rendered by the renderer,
   render the first scene information as pixels at a resolution based on the scaling factor,
   store the rendered pixels in the buffer queue as virtual display with a virtual resolution which is different from the physical resolution of the screen, and
   composite the virtual display on the screen,
   wherein the compositor is configured to provide a display at the physical resolution of the screen by consuming some or all of the rendered pixels provided by the renderer through the buffer queue.

9. The system according to claim 8, wherein the processor is configured to:
receive a control input and adjust the scaling factor in response to the control input.

10. The system according to claim 9, wherein the control input is based on at least one of a detected movement of the electronic device, a gaze tracking of the screen, a memory usage, a processor usage or an input from the application.

11. The system according to claim 8, wherein the processor is configured to:
identify second scene information to be rendered as pixels for display on the screen,
receive, at the renderer, second conditions information from the compositor,
generate a second scaling factor based on the second conditions information, the second scaling factor controlling a resolution of the second scene information as rendered,
render the second scene information as second pixels at a second resolution based on the second scaling factor,
store the rendered second pixels in a second buffer queue as a second virtual display, and
composite the second virtual display on the screen.

12. The system according to claim 11, wherein the processor is configured to:
generate the second scaling factor based on a prioritizing factor associated with the second scene information.

13. The system according to claim 10, wherein the control input is an input from the application, and the processor is configured to render the first scene information without modification of the application.

14. The system according to claim 8, wherein the application is a legacy application.

15. A non-transitory computer-readable medium comprising program code that, when executed by a processor, causes a system to:
identify first scene information to be rendered by a renderer, as pixels for display on an electronic device, the electronic device including a screen with a physical resolution, the first scene information associated with an application,
receive, at the renderer, conditions information from a compositor, the compositor consuming rendered pixels provided through a buffer queue,
generate a scaling factor based on the conditions information, the scaling factor controlling a resolution of the first scene information as rendered by the renderer,
render the first scene information as pixels at a resolution based on the scaling factor,
store the rendered pixels in the buffer queue as a virtual display with a virtual resolution which is different from the physical resolution of the screen, and
composite the virtual display on the screen,
wherein the compositor is configured to provide a display at the physical resolution of the screen by consuming some or all of the rendered pixels provided by the renderer through the buffer queue.

16. The non-transitory computer-readable medium of claim 15, further comprising program code that, when executed by the processor, causes the system to:
receive a control input, and
adjust the scaling factor in response to the control input.

17. The non-transitory computer-readable medium of claim 16, wherein the control input is based on at least one of a detected movement of the electronic device, a gaze tracking of the screen, a memory usage, a processor usage or an input from the application.

18. The non-transitory computer-readable medium of claim 15, further comprising program code that, when executed by the processor, causes the system to:
identify second scene information to be rendered as pixels for display on the screen,
receive, at the renderer, second conditions information from the compositor,
generate a second scaling factor based on the second conditions information, the second scaling factor controlling a resolution of the second scene information as rendered,
render the second scene information as second pixels at a second resolution based on the second scaling factor,
store the rendered second pixels in a second buffer queue as a second virtual display, and
composite the second virtual display on the screen.

19. The non-transitory computer-readable medium of claim 18, wherein the second scaling factor is generated based on a prioritizing factor associated with the second scene information.

20. The non-transitory computer-readable medium of claim 17, wherein the control input is an input from the application, and the first scene information is rendered without modification of the application.

* * * * *